United States Patent
Matov et al.

(10) Patent No.: US 9,092,292 B2
(45) Date of Patent: Jul. 28, 2015

(54) SHARED APPLICATION BINARY STORAGE

(71) Applicants: Peter K. Matov, Sofia (BG); Alexandrina Ivanova, Sofia (BG)

(72) Inventors: Peter K. Matov, Sofia (BG); Alexandrina Ivanova, Sofia (BG)

(73) Assignee: SAP SE, Walldorf (DE)

( * ) Notice: Subject to any disclaimer, the term of this patent is extended or adjusted under 35 U.S.C. 154(b) by 97 days.

(21) Appl. No.: 14/144,885

(22) Filed: Dec. 31, 2013

(65) Prior Publication Data

US 2014/0344802 A1    Nov. 20, 2014

Related U.S. Application Data

(60) Provisional application No. 61/824,072, filed on May 16, 2013.

(51) Int. Cl.

| | |
|---|---|
| G06F 7/00 | (2006.01) |
| G06F 17/00 | (2006.01) |
| H04M 1/64 | (2006.01) |
| G06F 15/173 | (2006.01) |
| G06F 9/44 | (2006.01) |
| G06F 9/445 | (2006.01) |

(52) U.S. Cl.
CPC ..................................... G06F 8/61 (2013.01)

(58) Field of Classification Search
CPC .............. G06F 8/10; G06F 8/36; G06F 8/60; G06F 8/68; G06F 9/44505; G06F 9/5044; G06F 11/1402; G06F 11/1443
See application file for complete search history.

(56) References Cited

U.S. PATENT DOCUMENTS

| | | | |
|---|---|---|---|
| 7,127,713 B2 | 10/2006 | Davis et al. | |
| 7,281,012 B2 | 10/2007 | Galchev | |
| 7,392,236 B2 | 6/2008 | Rusch et al. | |
| 7,512,936 B2 | 3/2009 | Schneider et al. | |
| 7,533,163 B1 | 5/2009 | Zenz et al. | |
| 7,543,280 B2 | 6/2009 | Rosenthal et al. | |
| 7,743,367 B1 | 6/2010 | Nikolov et al. | |
| 7,747,698 B2 | 6/2010 | Kovachka-dimitrova et al. | |
| 8,060,553 B2 | 11/2011 | Mamou et al. | |
| 8,296,408 B2 * | 10/2012 | Anke et al. | 709/223 |
| 8,423,954 B2 | 4/2013 | Ronen et al. | |
| 8,677,309 B2 * | 3/2014 | Xie et al. | 717/101 |
| 2004/0148184 A1 * | 7/2004 | Sadiq | 705/1 |
| 2006/0095435 A1 * | 5/2006 | Johnson et al. | 707/10 |
| 2008/0059517 A1 * | 3/2008 | Glania et al. | 707/103 X |
| 2008/0075246 A1 * | 3/2008 | Glania et al. | 379/88.22 |
| 2008/0077549 A1 * | 3/2008 | Glania et al. | 707/1 |

(Continued)

*Primary Examiner* — Don Wong
*Assistant Examiner* — Anibal Rivera
(74) *Attorney, Agent, or Firm* — Schwegman Lundberg & Woessner, P.A.

(57) ABSTRACT

Various embodiments include systems, methods, and software that leverage shared binary storage for several purposes. Such purposes, in some embodiments, include reduced deployment overhead in terms of data to transport, time to instantiate, and reduction, if not elimination, of redundancies and conflicts of and between software system components and configurations, such as by sharing single instances of binary files persisted in deployment units and avoiding duplicates thereof. In some such embodiments, deployment units of a software system, such as an ERP or other enterprise-class software system, are stored in a system database or other central data storage entity. In response to a request to instantiate a system based on the deployment units, the deployment units are staged in memory, metadata to facilitate deployment on a server is written, the deployment units and metadata are transmitted to each server to which deployment is requested, and the deployed system is started.

18 Claims, 4 Drawing Sheets

(56) References Cited

U.S. PATENT DOCUMENTS

| | | | |
|---|---|---|---|
| 2008/0183733 A1* | 7/2008 | Jackson | 707/101 |
| 2008/0270992 A1 | 10/2008 | Georgieva | |
| 2009/0132621 A1 | 5/2009 | Jensen et al. | |
| 2010/0082556 A1* | 4/2010 | Srinivasan et al. | 707/693 |
| 2010/0257517 A1* | 10/2010 | Sriram et al. | 717/168 |
| 2011/0161913 A1* | 6/2011 | Garimella et al. | 717/101 |
| 2011/0161914 A1* | 6/2011 | Xie et al. | 717/101 |
| 2011/0282914 A1 | 11/2011 | Block et al. | |
| 2012/0246281 A1 | 9/2012 | Chua | |
| 2012/0310850 A1 | 12/2012 | Zeng et al. | |

* cited by examiner

SHARED APPLICATION BINARY STORAGE

CROSS-REFERENCE TO RELATED APPLICATIONS

This application claims the benefit of U.S. Provisional Application No. 61/824,072, filed May 16, 2013 entitled, "SHARED APPLICATION BINARY STORAGE," which is incorporated herein by reference in its entirety.

BACKGROUND INFORMATION

Component or modularly based software systems, such as many Enterprise Resource Planning (ERP) and other enterprise-class software systems, often may be deployed with many different combinations of components or modules. As such, software systems are assembled from constituent components, either initially or through modification and enhancement over time, conflicting and redundant constituent components may can be included. Further, due to large numbers of components that can be of large data sizes when considering component binaries, configuration data files, and other data files, deployment can become time consuming and complex. However, in modern computing environments, enterprise-class software systems are often deployed in a flexible manner that allows enterprise-class software systems to be identically instantiated multiple times while executing against data stored in a single database to provide scalability and failover redundancy, among other reasons such as instantiation of testing and development system instances. Due to large data amounts, possibilities for component redundancies and conflicts, and many other constraints, managing, maintaining, and rapidly replicating system instances can be quite difficult and time consuming.

DETAILED DESCRIPTION

Figure 1:
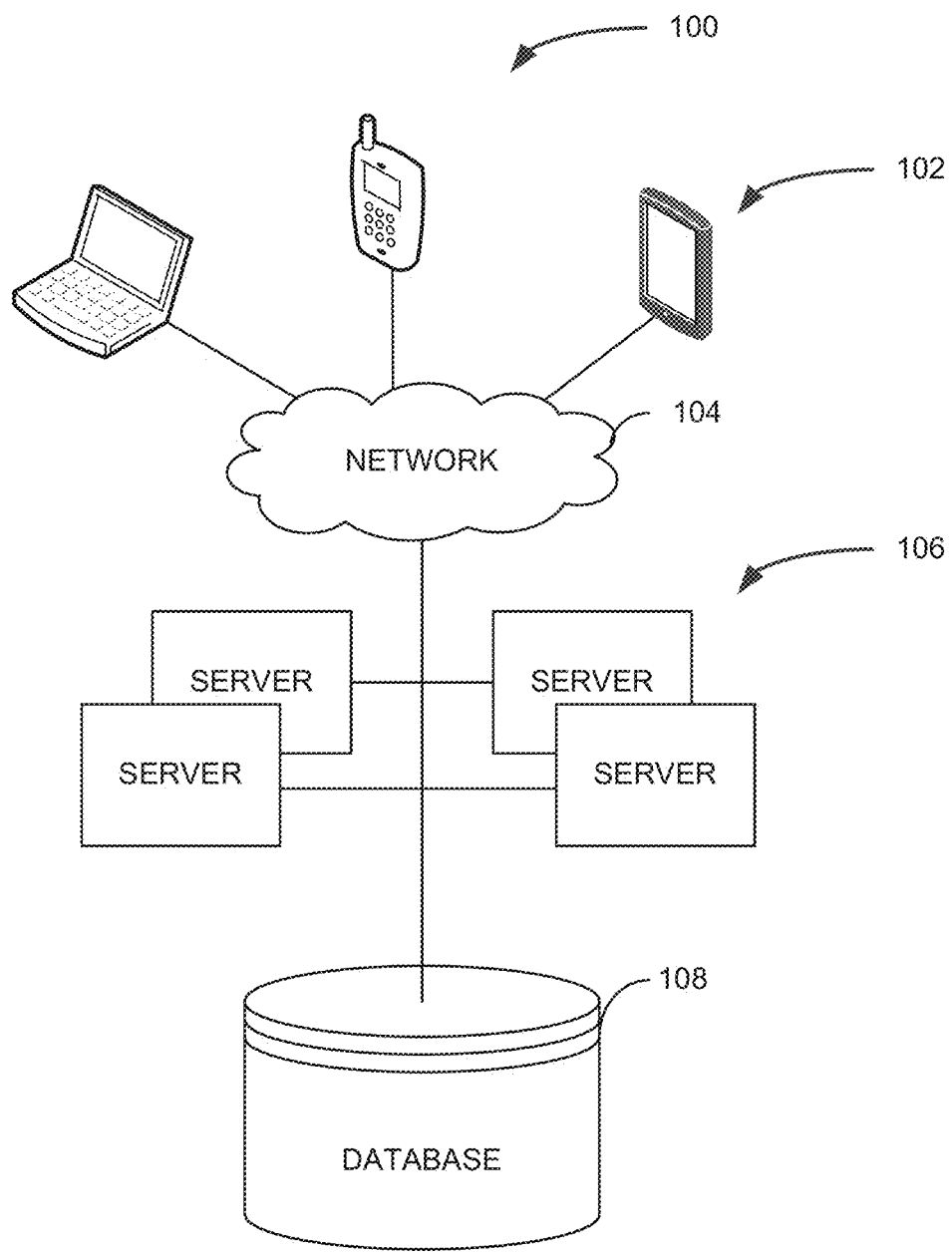
FIG. 1 is a logical block diagram of a system, according to an example embodiment.

Various embodiments illustrated and described herein include at least one of systems, methods, and software that leverage shared binary storage for several purposes. Such purposes, in some embodiments, include reduced deployment overhead in terms of data to transport, time to instantiate, and reduction, if not elimination, of redundancies and conflicts of and between software system components and configurations. In some such embodiments, deployment units of a software system, such as an ERP or other enterprise-class software system, are stored in a system database or other central data storage entity. In some embodiments, the database is the same database in which system transaction and master data is also stored.

Deployment units are generally self-contained system portions that are deployable and executable both independently of other system portions and in concert with other system portions. A deployment unit typically includes executable binaries, configuration data files, and other data files that are deployable to a server, such as a virtual machine or a physical computing server device, to implement system functionality and operate against data stored in the database. A deployment unit also includes a set of metadata. The set of metadata identifies the contents of the deployment unit, configuration data, data storage structures such as directories to which different elements of the deployment unit are to be deployed, and other data that may be relevant to the particular deployment unit, such as confounds to successful deployment, possible conflicts, minimum system requirements, and the like.

Deployment units may be obtained from an online marketplace of available deployment units, from install disks, from custom development, and other such sources. Deployment units may come in two different forms. A deployment unit may be in the form of a server deployment unit and applications or application component deployment units that can be deployed to a server and which together may form a server deployment unit. A server deployment unit is typically created when deployment is to be performed, such as through performance of the method 300 illustrated and described with regard to FIG. 3 below. The application or application add-on deployment units are deployment units that will be deployed on the server itself and will be stored by the different deployment containers responsible for them.

A server deployment unit is typically formed by obtaining stored application deployment units that may be aggregated into a server deployment unit and then deployed, under control of a startup framework that operates to identify deployment units to be included in a server deployment unit and deployed. This startup frame work may perform a number of functions in creation of a server deployment unit such as assembling the application deployment units in a memory or other storage device, optimizing the application deployment units for deployment with the server deployment unit, transports the server deployment unit to each server to be utilized, instantiates the software system on each server including data connections back to the database, and starts the system on each server. Each server to which the server deployment unit is deployed is generally identical to the other servers and each server provides a complete instance of the system. Thus, there may be one, two, three, or more servers that are instantiated to provide system capabilities. Each server operates against data stored in the same database, although in some embodiments there may be multiple synchronized instances of the database for failover and load balancing purposes. Similarly, each system is capable of performing the same tasks and providing the same functionality as the other servers for failover, scaling, and load balancing purposes.

In some embodiments, after one or more servers is instantiated, a need for another server may be arise, such as to replace a server that has failed, to meet an increased user or data processing demand, or other reasons. In such an instance, because the deployment units, including the system binary files, configuration files, and other files, as well as metadata as shared between all server instances is present in the database, the deployment units may be copied from the shared storage in the database or other data storage location and deployed again in a similar manner and brought online.

These and other embodiments are described herein with reference to the figures.

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims.

The functions or algorithms described herein are implemented in hardware, software or a combination of software and hardware in one embodiment. The software comprises computer executable instructions stored on computer readable media such as memory or other type of storage devices. Further, described functions may correspond to modules, which may be software, hardware, firmware, or any combination thereof. Multiple functions are performed in one or more modules as desired, and the embodiments described are merely examples. The software is executed on a digital signal processor, ASIC, microprocessor, or other type of processor operating on a system, such as a personal computer, server, a router, or other device capable of processing data including network interconnection devices.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

FIG. 1 is a logical block diagram of a system 100, according to an example embodiment. The system 100 is an example of a computing environment within which some embodiments may be implemented. The system 100 includes various client devices 102 connected to a network 104. Also connected to the network 104 are servers 106 and a database 108.

Although only three client devices 102 are illustrated, there may be a fewer number of client devices 102 or a greater number. Further the client devices 102 may include one or various types of computing devices 102, such as personal computers, tablet devices, smartphones, other handheld and mobile computing devices, automobile and television computing devices, set top boxes, and the like Similarly, although four servers 106 are illustrated, fewer servers 106 may be included in some embodiments while a greater number of servers 106 may be included in other embodiments. Additionally, the servers 106 may be physical computing devices each operating as a server or virtual machines that may execute on one or more computing devices. In some embodiments, the server may be an SAP J2EE AS Java application server available from SAP AG of Walldorf, Germany.

The network 104 may include one or more various network types. Such network types may include the Internet, a local area network a wide area network, a virtual private network, and other network types. Connections to the network 104 may be wired or wireless via various access points.

The database 108 is generally a relational database management system that may include one or both of an in-memory database, such as the HANA in-memory database available from SAP AG of Walldorf, Germany, or conventional relational database management systems available from many different providers. In other embodiments, the database 108 may be or otherwise include file storage outside of a relational database management system. Regardless of how data is stored by the database 108, the database 108 also provides various services and includes computing resources that are utilized to perform various tasks, such as management of binary files and other files of one or more software systems that may be deployed from the database 108 to one or more of the servers 106.

The database 108 stores transaction and master data of one or more software systems deployed to the servers 106. The database 108 also stores deployment units of one or more software systems. As mentioned above, deployment units are generally self-contained software system portions, such as modules, that are deployable and executable both independently of other software system portions and in concert with other software system portions. Deployment units, when deployed in concert, may operate together to form a larger software system. A deployment unit typically includes executable binary files, configuration data files, and other data files that are deployable to the servers 106 to implement software system functionality and operate against transaction and master data stored in the database 108.

A deployment unit also includes a set of metadata. The set of metadata identifies the contents of the deployment unit, configuration data, data storage structures such as directories to which different elements of the deployment unit are to be deployed, and other data that may be relevant to the particular deployment unit, such as confounds to successful deployment, possible conflicts, minimum system requirements, and the like. An example of a deployment unit is illustrated in FIG. 2.

Figure 2:
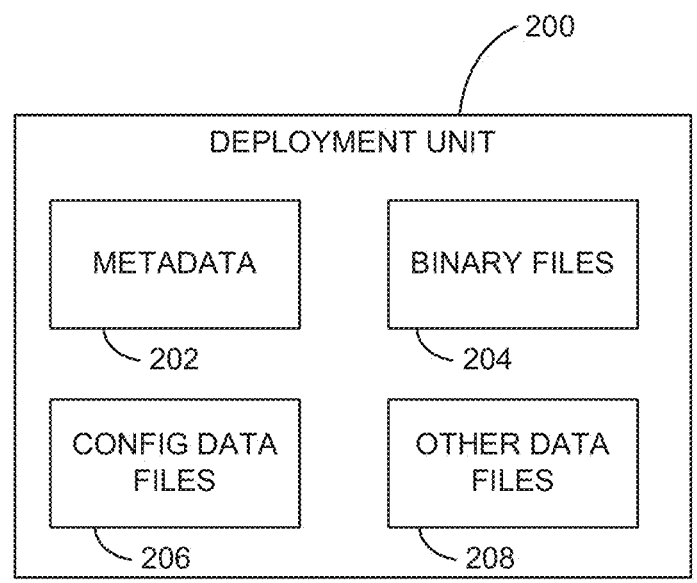
FIG. 2 is an illustration of a deployment unit, according to an example embodiment.

FIG. 2 is an illustration of a deployment unit 200, according to an example embodiment. The deployment unit 200 includes metadata 202, binary files, 204, configuration data files 206, and other data files 208. A typical deployment unit includes at least metadata 202 and binary files 204. However, in some instances, a deployment unit 200 may instead include the metadata 202 and one or both of the configuration data files 206 and other data files 208. Such embodiments may be present when one or more other deployment units 200 include binary files 204 that are either augmented or modified by a deployment unit including one or both of the configuration data files 206 and other data files 208.

The binary files 204, in some embodiments, are containers of JAVA binaries, such as JARS (JAVA Archives). In other embodiments, the binary files 204 are executable files or libraries of other binary files 204. In yet further embodiments, the binary files 204 may not be compiled, executable code, but instead by script files that are consumed by a scripting engine on a server. Regardless, the binary files 204 are intended to represent functional software system code, compiled or interpreted, that implements software system functionality.

The configuration data files 206 represent configuration data that is for population to configuration settings on a server to which the respective deployment unity 200 is to be deployed. Such configuration settings will typically set software system variables that modify or affect how binary files 204 operate when executed, facilitate network and data interconnections, establish security, and other such configurations.

The other data files 208 represent other data that may be included in a deployment of a software system, or portion thereof. Such other data may include user interface definitions, graphics that are presented within various software system user interfaces (i.e., company logos and other branding information), and other such data.

Returning now to FIG. 1, the deployment units may be received into the database 108 from a marketplace accessible via the network 104. The marketplace may provide mechanisms through which an entire software system may be obtained, software system add-ons, and additional content such as key performance indicators and other metrics. Deployment units may also be obtained and loaded from various non-transitory computer readable mediums, such as optical disks, Universal Serial Bus data storage devices, and the like. Regardless of where deployment units are obtained, they are stored in the database 108.

In some embodiments, the database 108 includes, or is augmented with, various processes to import deployment units and deploy a software system based on deployment units stored in the database. When importing deployment units, the database 108 processes may prevent a particular binary from being stored more than once. This reduces redundancy in stored data and in data that is to be transported to a server 106 during deployment. As a result, deployment is more efficient and consistency is maintained amongst stored transport units. In some embodiments, when importing a transport unit that includes a binary file that is already present, metadata included in transport unit being imported may be modified to identify a reliance on the binary file of the previously stored transport unit. The importing may further determine whether any configuration issues may exist between the previous stored binary file and the transport unit being imported. When a configuration issue is identified, an exception may trigger sending of a message to an administrator and cause the import to fail. Regardless of the particular embodiment, various embodiments may include differing modes of ensuring consistency and compatibility between deployment units. The processes further include deployment processes, such as is illustrated and described with regard to FIG. 3.

Figure 3:
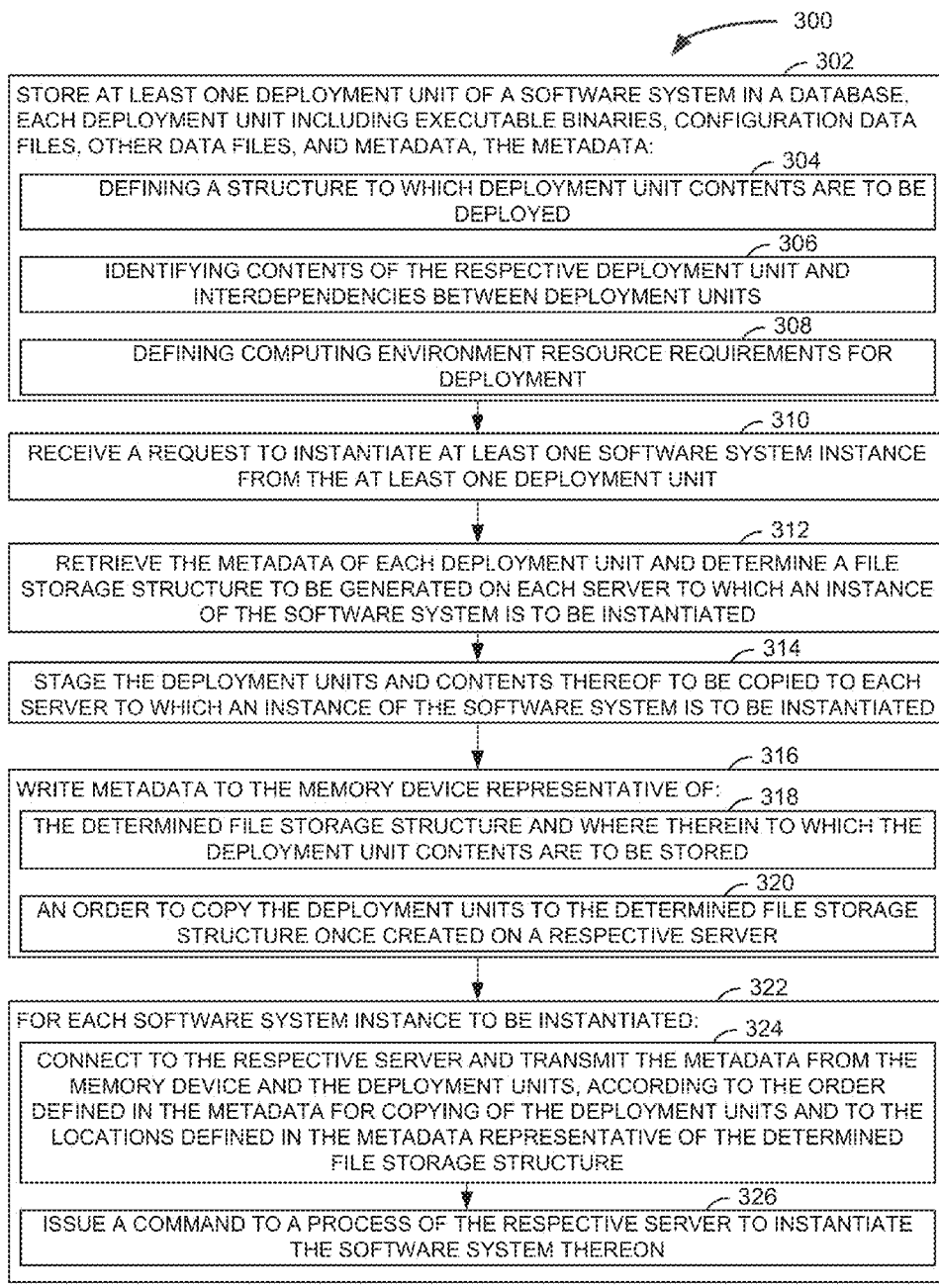
FIG. 3 is a block flow diagram of a method, according to an example embodiment.

FIG. 3 is a block flow diagram of a method 300, according to an example embodiment. The method 300 is an example of a method that may be performed by the database or a service that augments the database to deploy software system instances based on stored deployment units.

In some embodiments, the method 300 includes storing 302 at least one deployment unit of a software system in a database. Each deployment unit stored 302 in the database may include one or more of executable binaries, configuration data files, other data files, and metadata. The metadata in such embodiments may include metadata defining 304 a structure to which deployment unit contents are to be deployed, metadata identifying 306 contents of the respective deployment unit and interdependencies between deployment units, and metadata defining 306 computing environment resource requirements for deployment.

The method 300 further includes receiving 310 a request, such as a request received 310 via a network, to instantiate at least one software system instance from the at least one deployment unit. The method 300 may then retrieve 312 the metadata of each deployment unit and determine a file storage structure to be generated on each server to which an instance of the software system is to be instantiated. The method 300 then stages 314, in a memory device, the deployment units and contents thereof to be copied to each server to which an instance of the software system is to be instantiated. The method 300 further writes 316 metadata to the memory device representative of the determined file storage structure 318 and where within the structure to which the deployment unit contents are to be stored. Further metadata is written with regard to an order 320 to copy the deployment units to the determined file storage structure once created on a respective server.

Once the staging 314 of the deployment units and writing 316 of the metadata is complete, the method 300 may continue with the deployment for each software system to be instantiated 322. This may include connecting 324, via the network, to the respective server and transmitting the metadata from the memory device and the deployment units. The deployment units will be transmitted in an order according to the order defined in the metadata for copying of the deployment units and to the locations defined in the metadata representative of the determined file storage structure. Then the method 300 will issue 326 a command to a process of the respective server to instantiate the software system thereon.

In some such embodiments of the method 300, the computing environment resource requirements identified within the metadata of a deployment unit include data representative of one or more such requirements. For example, the metadata may identify at least one of a needed amount of data storage to store the contents of the respective deployment unit when deployed, a minimum amount of memory, network bandwidth that may be consumed, and processor resources to be consumed. These requirements are specific to the particular deployment unit and may identify a requirement for dedicated computing resources that are not to be shared with other deployment units. (Of particular note, such requirements are not requirements that are to be read with regard to requiring a particular element of a claim herein).

Figure 4:
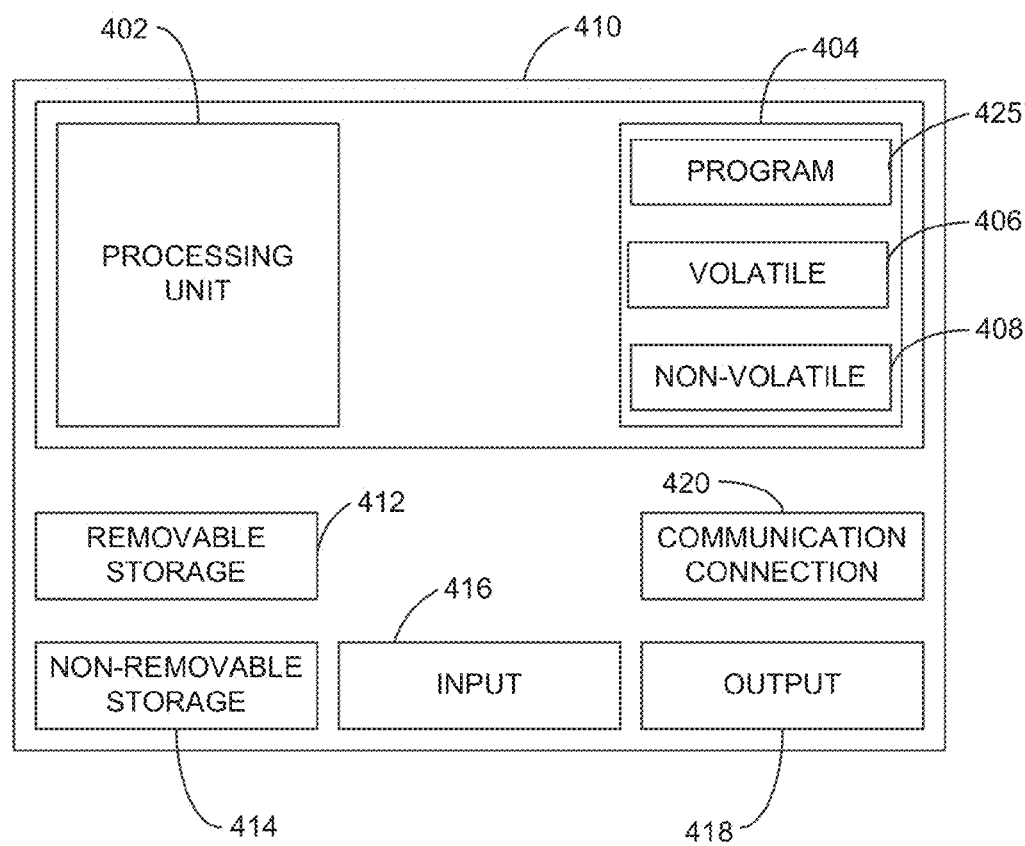
FIG. 4 is a block diagram of a computing device, according to an example embodiment.

FIG. 4 is a block diagram of a computing device, according to an example embodiment. In one embodiment, multiple such computer systems are utilized in a distributed network to implement multiple components in a transaction-based environment. An object-oriented, service-oriented, or other architecture may be used to implement such functions and communicate between the multiple systems and components. One example-computing device in the form of a computer 410, may include a processing unit 402, memory 404, removable storage 412, and non-removable storage 414. Although the example computing device is illustrated and described as computer 410, the computing device may be in different forms in different embodiments. For example, the computing device may instead be a smartphone, a tablet, or other computing device including the same or similar elements as illustrated and described with regard to FIG. 4. Further, although the various data storage elements are illustrated as part of the computer 410, the storage may also or alternatively include cloud-based storage accessible via a network, such as the Internet.

Returning to the computer 410, memory 404 may include volatile memory 406 and non-volatile memory 408. Computer 410 may include—or have access to a computing environment that includes a variety of computer-readable media, such as volatile memory 406 and non-volatile memory 408, removable storage 412 and non-removable storage 414. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 410 may include or have access to a computing environment that includes input 416, output 418, and a communication connection 420. The input 416 may include one or more of a touchscreen, touchpad, mouse, keyboard, camera, and other input devices. The computer may operate in a networked environment using a communication connection 420 to connect to one or more remote computers, such as database servers, web servers, and other computing device. An example remote computer may include a personal computer (PC), server, router, network PC, a peer device or other common network node, or the like. The communication connection 420 may be a network interface device such as one or both of an Ethernet card and a wireless card or circuit that may be connected to a network. The network may include one or more of a Local Area Network (LAN), a Wide Area Network (WAN), the Internet, and other networks.

Computer-readable instructions stored on a computer-readable medium are executable by the processing unit 402 of the computer 410. A hard drive (magnetic disk or solid state), CD-ROM, and RAM are some examples of articles including a non-transitory computer-readable medium. For example, various computer programs or apps, such as one or more applications and modules implementing one or more of the methods illustrated and described herein or an app or application that executes on a mobile device or is accessible via a web browser, may be stored on a non-transitory computer-readable medium.

ADDITIONAL EMBODIMENTS

Some embodiments may be implemented within JAVA environments. The following details apply to some such embodiments, among others.

Some embodiments avoid storing of duplicate binaries (i.e., multiple instances of the same binary) between different deployment units as well as providing access to the binaries stored by the other containers. In some such embodiments, when a deployment unit needs to recreate its metadata model, such as to reference a binary stored by a different deploy unit, the deployment unit needs access to all the application binaries. However, due to deployment service specifics, these binaries may be stored by different deployment units and may not be accessible from every deployment unit.

In some embodiments, the same or additional metadata models provide relative paths of the binaries within an application archive, such as a database within which the binaries and deployment units are stored, in order to resolve JAR files or other containers or binary elements referenced in the additional metadata. Thus, in some embodiments, in order to resolve incompatible relative path changes in the application archive, such as in the database where the deployment units are stored, the metadata models may include a mapping.

Before such embodiments, avoiding duplicate binaries between deployment units, as well as providing access to the binaries stored by other containers, has not been possible in JAVA implementations. In particular, is has not been possible to define a persistence unit, such as a deployment unit, for a third-party persistence provider in a JAR file of an application library folder, a JAR file stored by the library container, or in a WAR (Web Application Archive) file. Thus, through a defined persistence unit, it becomes possible to perform dynamic byte code modification for such persistence units.

In some such embodiments, such as in an application server Java embodiment, the deployment phase includes the following steps:
1. A Deploy Service identifies all the deployment containers that should process the application.
2. One by one, ordered by their priority, the Deploy Service invokes the containers' callbacks appropriate for the current application operation.
3. When the application is being deployed, the Deploy Service notifies the containers that the deploy operation is in the process of passing to the containers all the archives (i.e., JARs and WARs) for which these containers are responsible. As a result of this notification, every container should return an ApplicationDeployInfo message. Together with the components found in the archive, the references to other components, including the ApplicationDeployInfo, will contain the absolute paths to the binaries that it stores and that should be added in the ClassLoader. This ClassLoader will be created prior to the container startup phase.

With these steps above, it is possible that two or more containers are storing a copy of the same binary file. With the shared binary storage, duplicate storage of a binary is checked to determine if a given binary has already been processed and stored by another container. When the binary being processed is not already stored, the container may decide if the binary should be store in this binary or if it should be left in the library container. The library container stores all the binaries left from all other containers. Any container could use the shared binaries storage to access files (JARs, WARs, etc.) stored from the other containers. If after update one container is not present anymore, the file that this container was storing could be stored by another container or library container to keep the binaries that are not stored by the other containers.

Note that library container will not store the WARs that are not processed by the WAR container or the other containers. However this is not a problem for ORPersistence container since the Persistence Units defined in a WAR are visible only for the WAR components defined in this archive. Note that the case where entities in other archives of the application that extend classes from this WAR may give rise to an application error. Also note that the library container distinguishes between the JAR files left in the library container and the one from the application library folder that will be used by a heavy ClassLoader.

Additionally, as per JPA specification:
Persistence XML:
"One or more JAR files may be specified using the jar-file elements instead of or in addition to the mapping files specified in the mapping-file elements. If specified, these JAR files will be searched for managed persistence classes, and any mapping metadata annotations found on them will be processed, or they will be mapped using the mapping annotation defaults defined by this specification. Such JAR files are specified relative to the root of the persistence unit (e.g., utils/myUtils.jar)."

Thus, the ORPersistence container should be aware of the mapping between the relative paths of the binaries in the application and the full path where they are stored by the containers. This mapping resolves the referenced JAR files. The shared binary storage may therefore keep these mappings as well. The relative paths are not only needed to resolve JAR files, but also when creating the URLs for third-party EMF (Eclipse Modeling Framework) creation.

In some embodiments, since the WAR files will be stored by a WEB Container, the persistence unit for a third-party provider may not be defined in a WAR file, because the ORPersistence Container startup callback is called before the same callback of the WEB Container. For default persistence provider this restriction does not apply since it is created upon request, i.e. the startup callbacks of all containers are already invoked. However, this restriction may still not be resolved because the WEB Container is still not using shared binary storage. However, when the WEB Container is integrated with shared binary storage, such persistence untils may be defined.

In some embodiments, the container may recreate the metadata model in cases of incompatible changes thereto. However, in order to do this, the container, in some embodiments, gathers all the binaries from the application and the binaries of the referenced applications. The binaries from the application may be accessed using the shared binary storage and the binaries of the referenced applications may then be accessed through a temp ClassLoader-s similar to temp ClassLoader-s in Min tests.

Through such embodiments, JAR files stored by the library container are accessible through the shared binary storage. This makes it possible to process persistence units for third-party providers declared in a JAR file under the application library folder as well as in JAR files not processed by other containers, i.e. files that will be stored from library container.

Further, in the JPAClassTransformer the ORPersistence container may check if a class is loaded from an application regular or heavy class loader. However since it was not previously possible to define a persistence unit in a JAR file under the library folder, no such classes were available for transformation. However once all the JAR files stored by a library container are accessible through the shared binary storage, the transformation can be performed on such classes as well.

In some such embodiments, by avoiding duplicate binary files stored in one or both of the database and the file system, faster starter up and system upgrades on servers are possible. Further, faster deployment and update of various components is possible. Additionally, database and file system schema volume is decreased.

Further, persistence units for third-party providers can be defined, such as in a WAR file, in a JAR file within the application library folder, or in a binary left from other containers and stored by library containers. Additionally, dynamic byte code modifications for persistence units, such as deployment units are possible in some embodiments.

Additionally, some embodiments allow support of a larger set of third-party persistence providers, such as within Application Server (AS) Java of SAP AG of Walldorf, Germany. Further, application vendors having the ability to use third-party persistence providers allows for greater flexibility in choosing a third-party persistence provider and in their application or application add-on packaging strategy.

Also, in the case of incompatible changes, containers, such as the deployment units, can recreate their metadata models. This enables change to the model when a new feature or new specification should be or is implemented. Such embodiments facilitate shorter release cycles, such as when a new feature is desired or needed or a new specification should be implemented.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

What is claimed is:

1. A method comprising:
storing at least one deployment unit of a software system in a database, each deployment unit including executable binaries, configuration data files, other data files, and metadata, the metadata:
defining a structure to which deployment unit contents are to be deployed;
identifying contents of the respective deployment unit and interdependencies between deployment units; and
defining computing environment resource requirements for deployment;
receiving, via a network, a request to instantiate at least one software system instance from the at least one deployment unit;
retrieving the metadata of each deployment unit and determining a file storage structure to be generated on each server to which an instance of the software system is to be instantiated;
staging, in a memory device, the deployment units and contents thereof to be copied to each server to which an instance of the software system is to be instantiated;
writing metadata to the memory device representative of:
the determined file storage structure and where therein to which the deployment unit contents are to be stored; and
an order to copy the deployment units to the determined file storage structure once created on a respective server; and
for each software system instance to be instantiated:
connecting, via the network, to the respective server and transmit the metadata from the memory device and the deployment units, according to the order defined in the metadata for copying of the deployment units and to the locations defined in the metadata representative of the determined file storage structure; and
issuing a command to a process of the respective server to instantiate the software system thereon.

2. The method of claim 1, wherein the computing environment resource requirements identified within the metadata of a deployment unit include metadata identifying at least one of a needed amount of data storage to store the contents of the respective deployment unit when deployed, a minimum amount of memory, network bandwidth that may be consumed, and processor resources to be consumed.

3. The method of claim 1, wherein the request to instantiate the at least one system instance is received with data identifying at least two servers to which system instances are to be deployed.

4. The method of claim 3, wherein the at least two servers are each virtual machines.

5. The method of claim 1, wherein issuing the command to the process of the respective server to instantiate the software system thereon includes issuing a command to an interface on the respective server to execute a particular portion of the system copied to the respective server.

6. The method of claim 5, wherein the interface to which the command is issued is an operating system command line interface callable via the network.

7. A non-transitory computer-readable medium, with instructions stored thereon, which when executed by at least one processor of at least one computing device cause the at least one computing device to:
store at least one deployment unit of a software system in a database, each deployment unit including executable binaries, configuration data files, other data files, and metadata, the metadata:
defining a structure to which deployment unit contents are to be deployed;
identifying contents of the respective deployment unit and interdependencies between deployment units; and
defining computing environment resource requirements for deployment;
receive, via a network, a request to instantiate at least one software system instance from the at least one deployment unit;
retrieve the metadata of each deployment unit and determining a file storage structure to be generated on each server to which an instance of the software system is to be instantiated;

stage, in a memory device, the deployment units and contents thereof to be copied to each server to which an instance of the software system is to be instantiated;

write metadata to the memory device representative of:
the determined file storage structure and where therein to which the deployment unit contents are to be stored; and
an order to copy the deployment units to the determined file storage structure once created on a respective server; and for each software system instance to be instantiated:
connect, via the network, to the respective server and transmit the metadata from the memory device and the deployment units, according to the order defined in the metadata for copying of the deployment units and to the locations defined in the metadata representative of the determined file storage structure; and
issue a command to a process of the respective server to instantiate the software system thereon.

8. The non-transitory computer-readable medium of claim 7, wherein the computing environment resource requirements identified within the metadata of a deployment unit include metadata identifying at least one of a needed amount of data storage to store the contents of the respective deployment unit when deployed, a minimum amount of memory, network bandwidth that may be consumed, and processor resources to be consumed.

9. The non-transitory computer-readable medium of claim 7, wherein the request to instantiate the at least one system instance is received with data identifying at least two servers to which system instances are to be deployed.

10. The non-transitory computer-readable medium of claim 9, wherein the at least two servers are each virtual machines.

11. The non-transitory computer-readable medium of claim 7, wherein issuing the command to the process of the respective server to instantiate the software system thereon includes issuing a command to an interface on the respective server to execute a particular portion of the system copied to the respective server.

12. The non-transitory computer-readable medium of claim 11, wherein the interface to which the command is issued is an operating system command line interface callable via the network.

13. A system comprising:
a database management system storing data on at least one data storage device, the stored data including at least one deployment unit of a software system, each deployment unit including executable binaries, configuration data files, other data files, and metadata, the metadata:
defining a structure to which deployment unit contents are to be deployed;
identifying contents of the respective deployment unit and interdependencies between deployment units; and
defining computing environment resource requirements for deployment;
a deployment module executable by at least one processor to:
receive, via a network interface device, a request to instantiate at least one software system instance from the at least one deployment unit;
retrieve, from the database management system, the metadata of each deployment unit and determining a file storage structure to be generated on each server to which an instance of the software system is to be instantiated;
stage, in a memory device, the deployment units and contents thereof to be copied to each server to which an instance of the software system is to be instantiated;
write metadata to the memory device representative of:
the determined file storage structure and where therein to which the deployment unit contents are to be stored; and
an order to copy the deployment units to the determined file storage structure once created on a respective server; and
for each software system instance to be instantiated:
connect, via the network interface device, to the respective server and transmit the metadata from the memory device and the deployment units, according to the order defined in the metadata for copying of the deployment units and to the locations defined in the metadata representative of the determined file storage structure; and
issue a command to a process of the respective server to instantiate the software system thereon.

14. The system of claim 13, wherein the computing environment resource requirements identified within the metadata of a deployment unit include metadata identifying at least one of a needed amount of data storage to store the contents of the respective deployment unit when deployed, a minimum amount of memory, network bandwidth that may be consumed, and processor resources to be consumed.

15. The system of claim 13, wherein the request to instantiate the at least one system instance is received with data identifying at least two servers to which system instances are to be deployed.

16. The system of claim 15, wherein the at least two servers are each virtual machines.

17. The system of claim 13, wherein issuing the command to the process of the respective server to instantiate the software system thereon includes issuing a command to an interface on the respective server to execute a particular portion of the system copied to the respective server.

18. The system of claim 17, wherein the interface to which the command is issued is an operating system command line interface callable via the network interface device.

* * * * *